(12) United States Patent
Sanders (10) Patent No.: US 12,205,143 B2
(45) Date of Patent: Jan. 21, 2025

(54) FAST PROVISIONING AUTOMATIC CURTSY

(71) Applicant: ABL IP HOLDING LLC, Conyers, GA (US)

(72) Inventor: Alan David Sanders, Atlanta, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 112 days.

(21) Appl. No.: 18/127,834

(22) Filed: Mar. 29, 2023

(65) Prior Publication Data

US 2024/0330984 A1 Oct. 3, 2024

(51) Int. Cl.
*G06Q 30/02* (2023.01)
*G06Q 30/0251* (2023.01)
*H04B 17/318* (2015.01)

(52) U.S. Cl.
CPC ....... *G06Q 30/0261* (2013.01); *H04B 17/318* (2015.01)

(58) Field of Classification Search
CPC ....... G06Q 30/0261; G06Q 30/0207–30/0277; H04B 17/318
See application file for complete search history.

(56) References Cited

U.S. PATENT DOCUMENTS

| | | | |
|---|---|---|---|
| 9,287,976 B2 | 3/2016 | Ganick et al. | |
| 9,509,402 B2 | 11/2016 | Ryan et al. | |
| 9,560,727 B2 * | 1/2017 | Reh | H05B 47/19 |
| 9,749,782 B2 | 8/2017 | Jovicic et al. | |
| 10,003,401 B2 | 6/2018 | Ryan et al. | |
| 10,021,770 B2 * | 7/2018 | Turvy, Jr. | H04L 12/44 |
| 10,371,504 B2 | 8/2019 | White et al. | |
| 10,492,279 B2 * | 11/2019 | Roquemore, III | H05B 47/19 |
| 10,707,959 B2 | 7/2020 | Verma et al. | |
| 11,438,225 B2 * | 9/2022 | Anderson | H05B 45/14 |
| 2012/0200226 A1 | 8/2012 | Knibbe et al. | |
| 2013/0342131 A1 * | 12/2013 | Recker | H05B 45/00 315/297 |
| 2016/0178724 A1 | 6/2016 | Ganick et al. | |

(Continued)

FOREIGN PATENT DOCUMENTS

EP 3462207 A1 4/2019

*Primary Examiner* — Thuy N Nguyen
(74) *Attorney, Agent, or Firm* — Buchanan Ingersoll & Rooney PC (57) ABSTRACT

A method includes receiving, via a wireless communication interface of a provisioning device, wireless advertisements from lighting system elements. The method further includes determining, via the provisioning device, signal strengths to the lighting system elements based on the wireless advertisements or reported signal levels between the lighting system elements. The method further includes forming a lighting control group by the following steps. First, iteratively transmitting, via the provisioning device, a flashing command to each lighting system element to cause a light source on a lighting system element to flash in order of the determined signal strengths from highest to lowest. Second, determining whether the lighting system element with the light source flashing is being added to the lighting control group. Third, assigning, via the provisioning device, some or all of the lighting system elements to the lighting control group based on the determination.

20 Claims, 4 Drawing Sheets

(56) References Cited

U.S. PATENT DOCUMENTS

| | | |
|---|---|---|
| 2016/0219676 A1* | 7/2016 | Mohan .................. G01S 5/0027 |
| 2016/0352425 A1 | 12/2016 | Ganick et al. |
| 2017/0245352 A1* | 8/2017 | Van Der Brug ....... H05B 47/18 |
| 2018/0027598 A1* | 1/2018 | Roquemore, III .... H04L 67/141 |
| | | 370/254 |
| 2018/0027633 A1* | 1/2018 | Roquemore, III ..... H05B 47/19 |
| | | 370/254 |
| 2018/0054706 A1 | 2/2018 | Kastee et al. |
| 2018/0205458 A1 | 7/2018 | Hixon et al. |
| 2018/0206315 A1* | 7/2018 | Roquemore, III .... H04W 76/10 |
| 2020/0288558 A1* | 9/2020 | Anderson .............. H05B 45/10 |
| 2021/0083530 A1* | 3/2021 | McMahon .............. H02J 50/90 |
| 2021/0266701 A1* | 8/2021 | Kuber .................... H04W 4/33 |
| 2021/0400793 A1* | 12/2021 | Baker .................. H04W 4/029 |

* cited by examiner

FAST PROVISIONING AUTOMATIC CURTSY

BACKGROUND

Provisioning typically adds lighting system elements to a wireless network, or establishes a wireless link between multiple lighting system elements. Once provisioned, a lighting system element becomes an RF node of the wireless network.

However, deployment of substantial numbers of lighting system elements, such as luminaires with associated controllers and/or sensors and networking thereof presents increasing challenges for set-up and management of the lighting system elements and network communication elements of the lighting system. Provisioning the lighting system to create a physical or logical networking map of the space in a room, building, etc. where the lighting system elements are installed is a manual process.

During provisioning, a technician may select a luminaire and assign the luminaire a particular network address. The technician then reads a lighting controls plan document, which can include lighting control group/zone information for the luminaires, and then manipulates lighting control devices and sensors to transcribe lighting behavior onto the luminaires. The technician will often take hours or multiple days to coordinate where luminaires are coordinated in relation to a map of the space and the applications for which the luminaires are being controlled, such as for a networked space lighting system. As a result of the manual mapping process, mistakes are often made and installation becomes more of an iterative process for technicians.

An automatic curtsy protocol is needed to overcome these and other limitations in the art.

SUMMARY

In a first example, a lighting system 100 includes a plurality of lighting system elements 104A-X and a provisioning device 107. The provisioning device 107 includes a wireless communication interface 192 configured for wireless communication, a memory 190, and a processor 191 coupled to the wireless communication interface 192 and the memory 190. The provisioning device 107 further includes automatic curtsy programming 194 in the memory 190. Execution of the automatic curtsy programming 194 by the processor 191 configures the provisioning device 107 to implement the following functions. The provisioning device 107 receives, via the wireless communication interface 192 of the provisioning device 107, wireless advertisements 115A-X from a plurality of lighting system elements 104A-X. The provisioning device 107 determines signal strengths 196A-X to the lighting system elements 104A-X based on the wireless advertisements 115A-X or reported signal levels between the lighting system elements 104A-X. The provisioning device 107 forms a lighting control group 305A by the following technique. First, the provisioning device 107 iteratively transmits a flashing command 198A-X to each lighting system element 104A-X to cause a light source 134 on a lighting system element 104A to flash in order of the determined signal strengths 137A-X from highest to lowest (e.g., strongest to weakest). Second, the provisioning device 107 determines whether the lighting system element 104A with the light source 134 flashing is being added to the lighting control group 305A. Third, the provisioning device 107 assigns, via the provisioning device 107, some or all of the lighting system elements 104A-X to the lighting control group 305A based on the determination.

In a second example, a method includes receiving, via a wireless communication interface 192 of a provisioning device 107, wireless advertisements 115A-X from lighting system elements 104A-X. The method further includes determining, via the provisioning device 107, signal strengths 196A-X to the lighting system elements 104A-X based on the wireless advertisements 115A-X or reported signal levels between the lighting system elements 104A-X. The method further includes forming a lighting control group 305A by the following steps. First, iteratively transmitting, via the provisioning device 107, a flashing command 198A-X to each lighting system element 104A-X to cause a light source 134 on a lighting system element 104A to flash in order of the determined signal strengths 196A-X from highest to lowest. Second, determining whether the lighting system element 104A with the light source 134 flashing is being added to the lighting control group 305A. Third, assigning, via the provisioning device 107, some or all of the lighting system elements 104A-X to the lighting control group 305A based on the determination.

In a third example, a non-transitory machine-readable medium includes automatic curtsy programming 194. Execution of the automatic curtsy programming 194 by a processor 191 configures a provisioning device 107 to implement the following functions. The provisioning device 107 receives, via the wireless communication interface 192 of the provisioning device 107, wireless advertisements 115A-X from a plurality of lighting system elements 104A-X. The provisioning device 107 determines, via the provisioning device 107, signal strengths 196A-X to the lighting system elements 104A-X based on the wireless advertisements 115A-X or reported signal levels between the lighting system elements 104A-X. The provisioning device 107 forms a lighting control group 305A by the following technique First, the provisioning device 107 iteratively transmits, via the provisioning device 107, a flashing command 198A-X to each lighting system element 104A-X to cause a light source 134 on a lighting system element 104A to flash in order of the determined signal strengths 196A-X from highest to lowest. Second, the provisioning device 107 determines whether the lighting system element 104A with the light source 134 flashing is being added to the lighting control group 305A. Third, the provisioning device 107 assigns, via the provisioning device 107, some or all of the lighting system elements 104A-X to the lighting control group 305A based on the determination.

BRIEF DESCRIPTION OF THE DRAWINGS

The drawing figures depict one or more implementations in accord with the present teachings, by way of example only, not by way of limitation. In the figures, like reference numerals refer to the same or similar elements.

PARTS LISTING

100 Lighting System
104A-X Lighting System Elements

107 Provisioning Device
108 Network
115A-X Wireless Advertisements
120 Space
121A-P Luminaires
122A-D Lighting Control Devices
123A-D Occupancy, Daylight, or Audio Sensors
130 Memory
131 Processor
132 Network Communication Interface
133 Driver Circuit
134 Illumination Light Source
135 Illumination Lighting
136 Flash Programming
137A-X Network Addresses
140 MCU
146 Switches or Touch Screen Display
155 Drive/Sense Circuitry
156 Detectors
190 Memory
191 Processor
192 Wireless Communication Interface
194 Automatic Curtsy Programming
196A-X Signal Strengths
197 Predetermined Time Period
198A-X Flashing Commands
199 Image Sensor (e.g., Camera)
200 Automatic Curtsy Protocol
300A-B Location
301A-B Room
305A-B Lighting Control Group/Zone
427A-P Location Coordinates
498A-B Physical Location

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g., of sufficient intensity for general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The term "lighting system," as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers.

Terms such as "artificial lighting" or "illumination lighting" as used herein, are intended to encompass essentially any type of lighting that a device produces light by processing of electrical power to generate the light. A luminaire for an artificial lighting or illumination lighting application, for example, may take the form of a lamp, light fixture, or other luminaire arrangement that incorporates a suitable light source, where the lighting device component or source(s) by itself contains no intelligence or communication capability. The illumination light output of an artificial illumination type luminaire, for example, may have an intensity and/or other characteristic(s) that satisfy an industry acceptable performance standard for a general lighting application.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals Reference now is made in detail to the examples illustrated in the accompanying drawings and discussed below.

Figure 1:
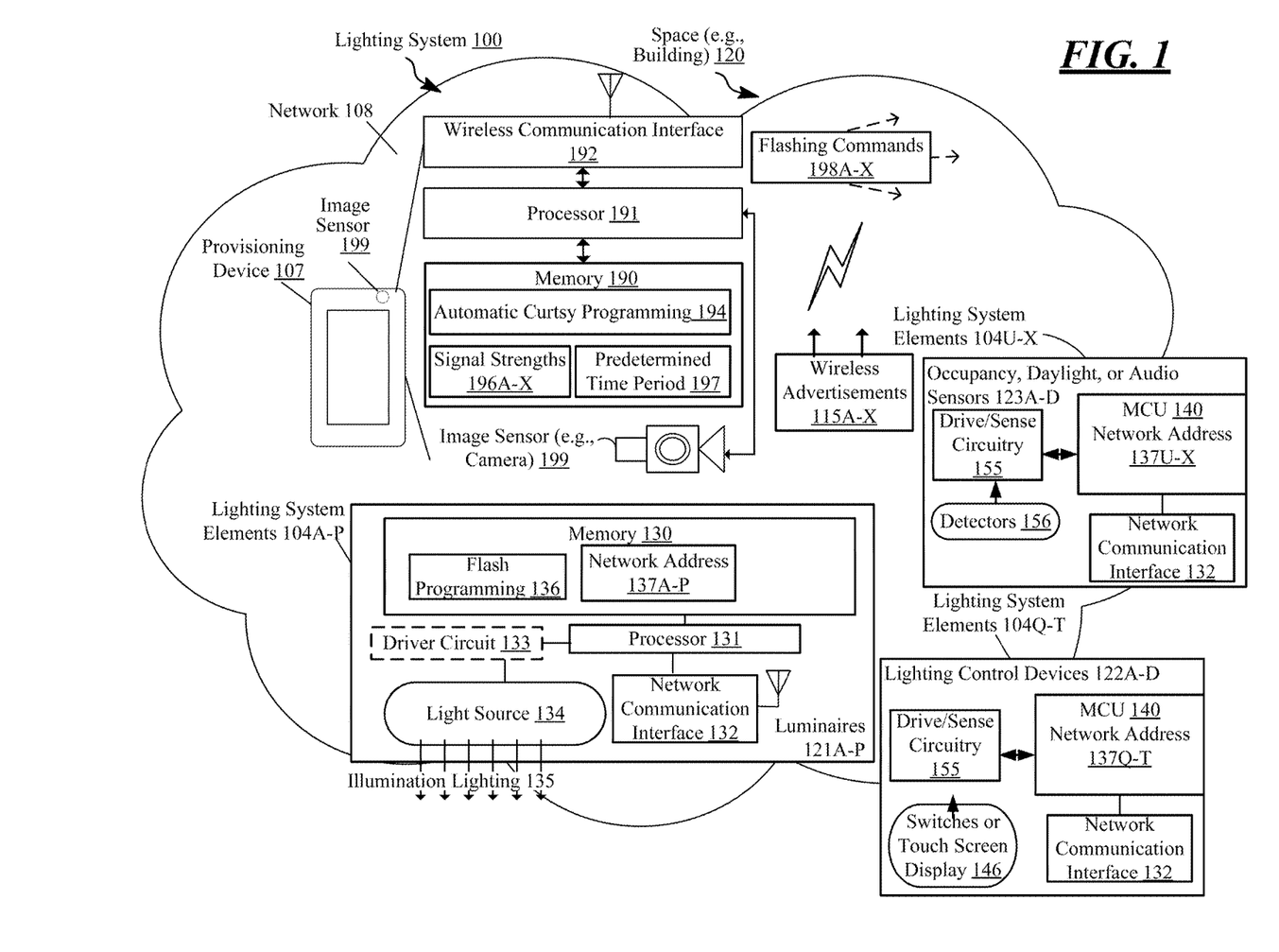
FIG. 1 depicts a lighting system that includes a provisioning device for fast provisioning of lighting system elements via automatic curtsy.

FIG. 1 depicts a lighting system 100 that includes a provisioning device 107 for fast provisioning of the lighting system elements 104A-X via automatic curtsy. Provisioning device 107 of a user (e.g., a human or a robot) can be any computing device, such as a smartphone, tablet computing device, wearables (e.g., hearing aid, Google Glass, smart watch, or implantables), or laptop/personal computing device. During provisioning, the provisioning device 107 assigns a respective network address 137A-X to the lighting system elements 104A-X and forms lighting control groups/zones 305A-B (see FIG. 3).

Lighting system elements 104A-X of the lighting system 100 are located in a space 120, such as a building. In the example, lighting system elements 104A-P are luminaires 121A-P; lighting system elements 104Q-T are lighting control devices 122A-D; and lighting system elements 104A-U-X are occupancy, daylight, or audio sensors 123A-D. Luminaires 121A-X illuminate the space 120 of a premises to a level useful for a human in or passing through the space 120, e.g. general illumination of the space 120, such as a warehouse, room, or a corridor in a building; or of an outdoor space such as a street, sidewalk, parking lot or performance venue. Lighting control devices 122A-D can be wall switches or touch screen devices to turn on/off or dim luminaires 121A-X. Occupancy, daylight, or audio sensors 123A-D can enable controls for on/off, occupancy, and dimming of the luminaires 121A-P.

As shown, luminaires 121A-P include a light source 134, such as an illumination light source to emit illumination lighting 135 for the space 120; and an optional driver circuit 133 coupled to the illumination light source 134 to control operation of the illumination light source 134. In some examples, the luminaires 121A-P may include a ballast instead of the driver circuit 133 depending on the type of illumination light source 134 (e.g., for a fluorescent or incandescent light bulb).

Luminaires 121A-P further include a network communication interface 132 configured for wireless communication, for example, over the network 108 (e.g., a short range wireless network), with the provisioning device 107. The luminaires 121A-P further include a memory 130; and a processor 131 coupled to the illumination light source 134, network communication interface 132, and the memory 130. In addition, the luminaires 121A-X further include a respective network address 137A-P stored in the memory 130, which may be assigned during provisioning by the provisioning device 107. Luminaires 121A-P further include flash programming 136 in the memory 130 and execution of the flash programming 130 by the processor 131 causes the respective luminaire 121A-P to flash the light source 134 in response to receiving a flashing command 198A-P from the provisioning device 107.

As shown, each of the occupancy, daylight, and audio sensors 123A-D includes an on-board micro-control unit (MCU) 140 that includes a memory (volatile and non-volatile) and a central processing unit (CPU). Occupancy, daylight, or audio sensors 123A-D have the MCU 140 coupled to drive/sense circuitry 155 operable to control detectors 156 and a network communication interface 132. The memory of the MCU 140 of the occupancy, daylight, or audio sensors 123A-D stores network addresses 137U-X which may be assigned during provisioning by the provisioning device 107.

The circuitry, hardware, and software of the lighting control devices 122A-D shown are similar to the occupancy, daylight, or audio, sensors 123A-D. Lighting control devices 122A-D can be a wall switch where the drive/sense circuitry 155 responds to switches 146. Switches 146 can be an on/off switch, dimmer switch, or set scene. Switches 146 can be a single shared button switch for on/off, dimming, or set scene functions. A button station can include various button settings that can have the lighting control settings adjusted, for example, four buttons can be arranged with two longitudinal buttons (north-south) and two lateral buttons (east-west). Alternatively, lighting control devices 122A-D can be a touchscreen device in which lighting control setting adjustments are inputted via a user interface application (not shown) through manipulation or gestures on a touch screen display 146. As shown, the memory of the MCU 140 of the lighting control devices 122A-D stores network addresses 137Q-T.

Figure 2:
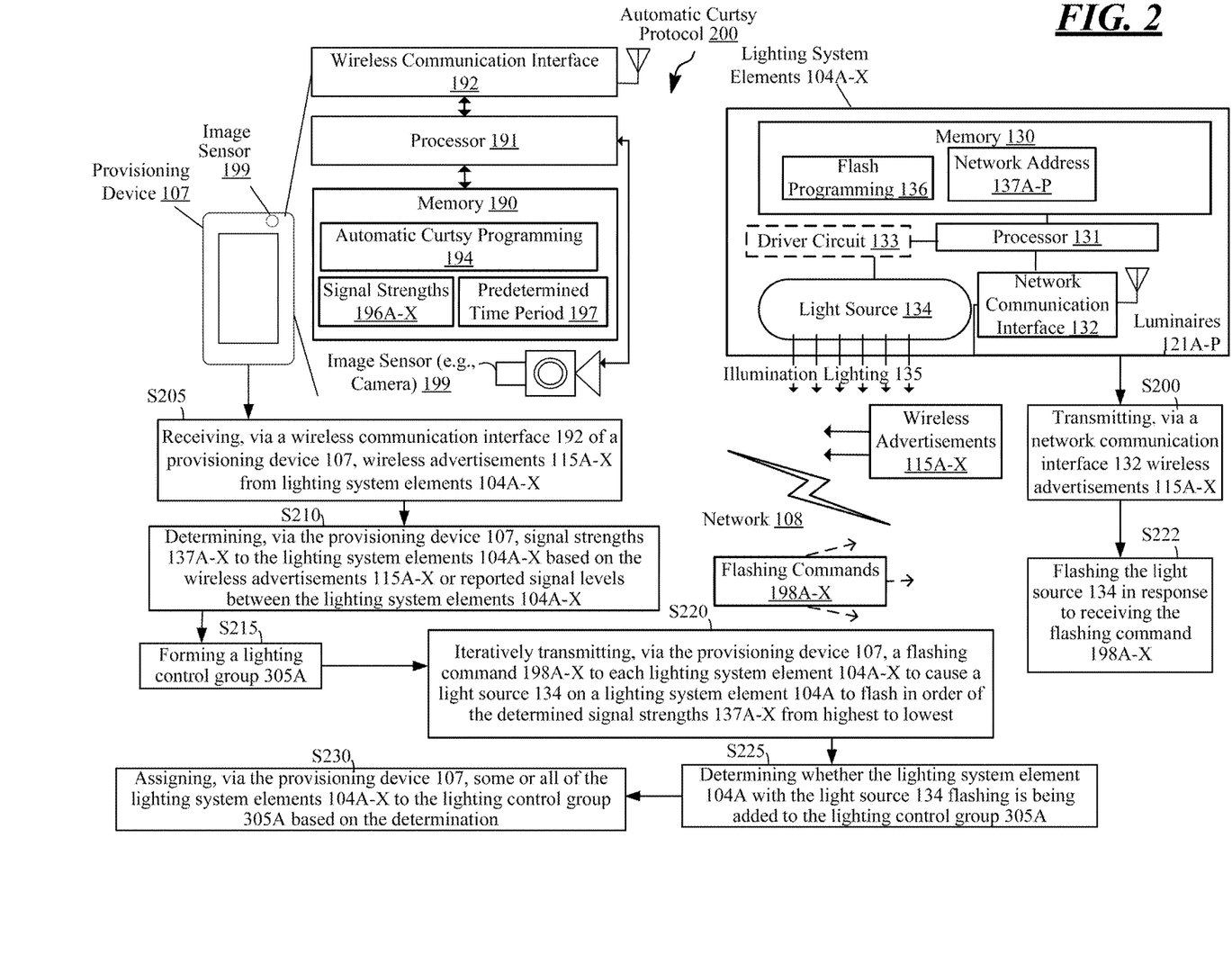
FIG. 2 is an automatic curtsy protocol for the lighting system that is implemented by the provisioning device and lighting system elements.

FIG. 2 is an automatic curtsy protocol 200 for the lighting system 100 that is implemented by the provisioning device 107 and lighting system elements 104A-X. Automatic curtsy protocol 200 enables fast provisioning of the lighting system elements 104A-X into lighting control groups/zones 305A-B (see FIG. 3).

In the example of FIG. 2, the automatic curtsy protocol 200 is implemented in the automatic curtsy programming 194 of the provisioning device 107 and the flash programming 136 of the lighting system elements 104A-X, such as luminaires 121A-P. Execution of the automatic curtsy programming 194 stored in a memory 190 by a processor 191 of the provisioning device 107 configures the provisioning device 107 to implement blocks S205, S210, S215, S220, S225, and S230 described below. Execution of flash programming 136 stored in a memory 130 by a processor 131 of the luminaires 121A-P, causes the luminaires 121A-P to implement block S200 and S222 described below.

Beginning in block S200, the automatic curtsy protocol 200 includes transmitting, via a network communication interface 132 of lighting system elements 104A-X, wireless advertisements 115A-X. Moving to block S205, the automatic curtsy protocol 200 further includes receiving, via the wireless communication interface 192 of the provisioning device 107, wireless advertisements 115A-X from the plurality of lighting system elements 104A-X. Continuing to block S210, the automatic curtsy protocol 200 further includes determining, via the provisioning device 107, signal strengths 196A-X to the lighting system elements 104A-X based on the wireless advertisements 115A-X or reported signal levels between the lighting system elements 104A-X. Signal strengths 196A-X can be between the provisioning device 107 and the lighting system elements 104A-X based on the wireless advertisements 115A-X. Alternatively or additionally, the lighting system elements 104A-X are ranked using reported signal levels between the lighting system elements 104A-X. So instead of using the signal levels from lighting system elements 104A-D to the provisioning device 107 as signal strengths 196A-D, the signal levels that lighting system element 104A records of lighting system elements 104B-D to lighting system element 104A can be used; signal levels that lighting system element 104B records of lighting system elements 104A, 104C, and 104D can be used; etc.

Proceeding now to block S215, the automatic curtsy protocol 200 further includes forming a lighting control group 305A by the following steps. Initially, in block S220, iteratively transmitting, via the provisioning device 107, a flashing command 198A-X to each lighting system element 104A-X to cause a light source 134 on a lighting system element 104A to flash in order of the determined signal strengths 196A-X from highest to lowest. Next, in block S225, determining whether the lighting system element 104A with the light source 134 flashing is being added to the lighting control group 305A. Finishing now, in block S230, assigning, via the provisioning device 107, some or all of the lighting system elements 104A-X to the lighting control group 305A based on the determination. Referring back to block S222, the automatic curtsy protocol further includes in response to receiving the flashing command 198A-X, flashing the light source 134 of the lighting system elements 104A-X.

Figure 3:
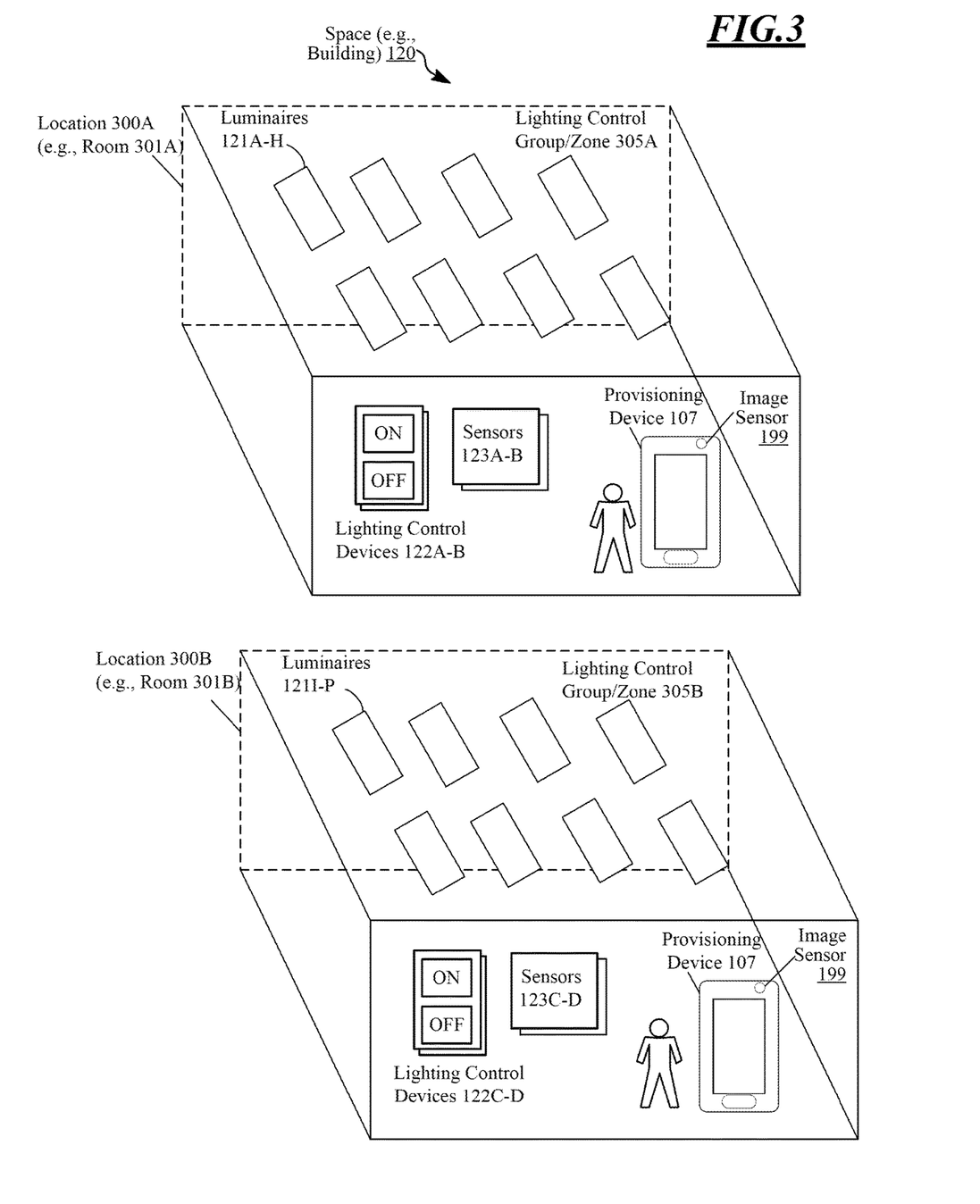
FIG. 3 depicts the provisioning device being carried through a space, such as a building, including a plurality of different rooms, during the automatic curtsy protocol.

FIG. 3 depicts the provisioning device 107 being carried through the space 120, including a plurality of different rooms 301A-B, during the automatic curtsy protocol 200. As shown, the provisioning device 107 is carried in various locations 300A-B in the space 120. In the example of FIG. 3, the locations 300A-B include two different rooms 301A, 301B. A first room 301A includes luminaires 121A-H, lighting control devices 122A-B, and occupancy, daylight, or audio sensors 123A-B. A second room 301B includes luminaires 121I-P, lighting control devices 122C-D, and occupancy, daylight, or audio sensors 123C-D. Accordingly, in the automatic curtsy protocol 200, the lighting control groups/zones 305A-N (and assigned network addresses 137A-X) can be tied to locations 300A-B of the lighting system elements 104A-X.

To tie the locations 300A-B of the lighting system elements 104A-X to lighting control groups/zones 305A-B, the automatic curtsy protocol 200 can include the following. In a first example, the block S225 (see FIG. 2) of determining whether the lighting system element 104A with the light source 134 flashing is being added to the lighting control group 305A includes: awaiting, on the provisioning device 107, for a selection of the lighting system element 104A with the light source 134 flashing for addition to the lighting control group 305A. In a second example, the block S225 (see FIG. 2) of determining whether the lighting system element 104A with the light source 134 flashing is being added to the lighting control group 305A further includes: based on expiry of a predetermined time period 197 during which the lighting system element 104A is not selected for addition to the lighting control group 305A, excluding the lighting system element 104A from the lighting control group 305A. In a third example, the block S225 (see FIG. 2) of determining whether the lighting system element 104A with the light source 134 flashing is being added to the lighting control group 305A further includes: based on the lighting system element 104A being selected for addition to the lighting control group 305A within a predetermined time period 197, adding the lighting system element 104A to the lighting control group 305A.

In a fourth example, the block S210 (see FIG. 2) of determining whether the lighting system element 104A with the light source 134 flashing is being added to the lighting control group 305A includes the following. First, detecting, via an image sensor 199 of the provisioning device 107, the light source 134 of the lighting system element 104A is flashing. Second, in response to detecting the light source 134 of the lighting system element 104A is flashing, determining that the lighting system element 104A is in a room 301A of the lighting control group 305A and is being added to the lighting control group 305A.

Figure 4:
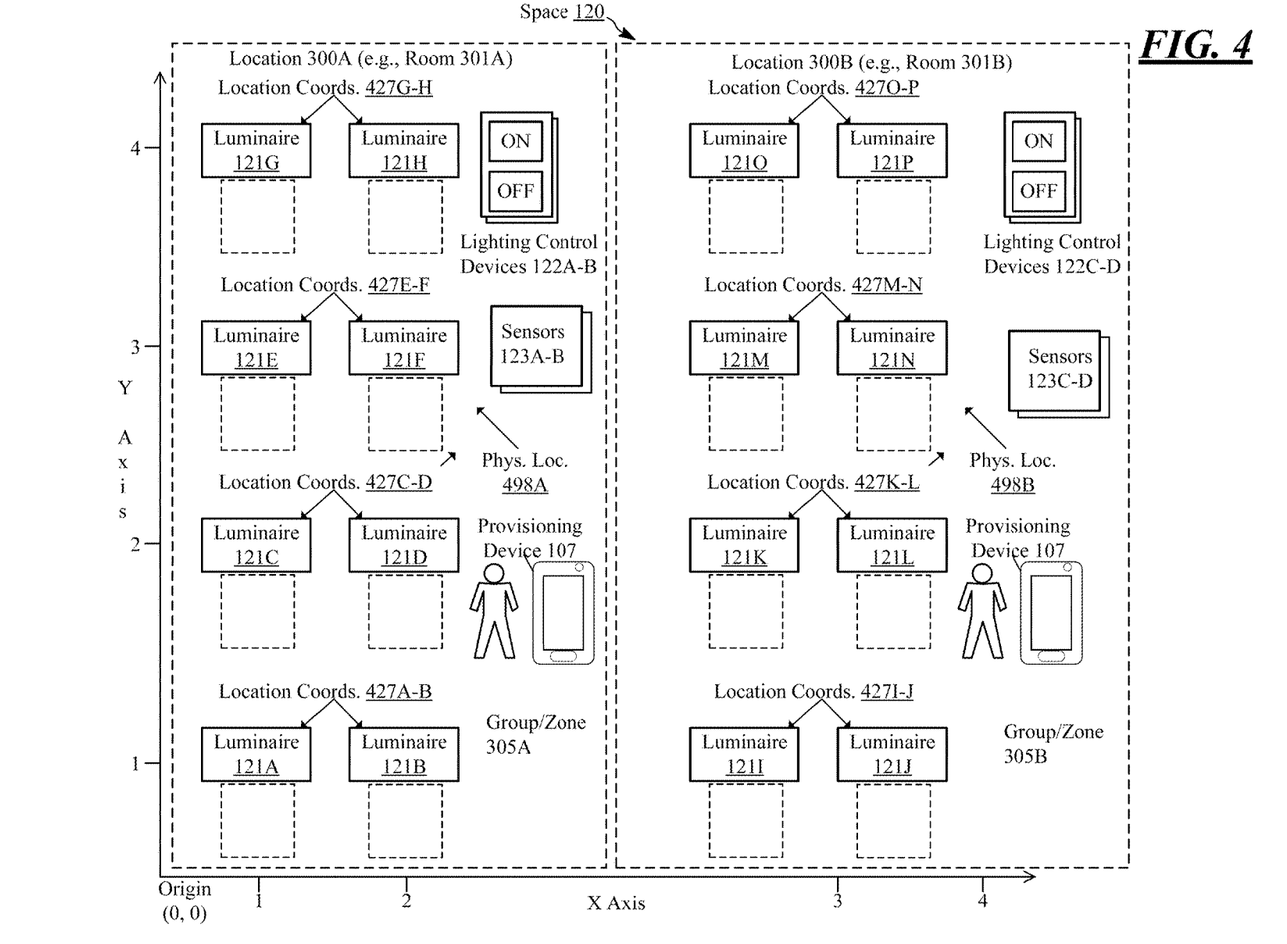
FIG. 4 is a schematic of the lighting system of FIGS. 1-3 that includes a visual layout of a plurality of luminaires as represented by a respective set of location coordinates.

FIG. 4 is a schematic of the lighting system 100 of FIGS. 1-3 that includes a visual layout of a plurality of luminaires 121A-P as represented by a respective set of location coordinates 427A-P. Locations 300A-B of the luminaires 121A-P and other lighting system elements 104Q-X can be defined for room level programming, particularly lighting control groups/zones 305A-B.

In FIG. 4, eight luminaires 121A-H, two lighting control devices 122A-B, and two occupancy, daylight, or audio sensors 123A-B form a first lighting control group/zone 305A located in a first room 301A that forms a first lighting control group/zone 305A. Lighting control devices 122A-B and sensors 123A-B control all of the luminaires 121A-H in the first room 301A.

As further shown, eight other luminaires 121I-P, two other lighting control devices 122C-D, and two other occupancy, daylight, or audio sensors 123C-D form a second group/zone 305B located in a second room 301B. Lighting control devices 122C-D and sensors 123C-D control all of the luminaires 121I-P in the second room 301B. Hence, each lighting control group/zone 305A-B includes a respective plurality of member lighting system elements 104A-L (twelve members each).

Initially, the lighting system elements 104A-X may not know which of the other lighting system elements 104A-X are near and in the same room 301A-B. Hence, the user can utilize the provisioning device 107 and associated automatic curtsy programming 194 to find uncommissioned luminaires 121A-P, lighting control devices 122A-D, and occupancy, daylight, or audio sensors 123A-D; add them to the space 120; and exchange encryption keys. The user, such as an installer, can specify with the automatic curtsy programming 194 that luminaires 121A-H are in same room 301A along with lighting control devices 122A-B and sensors 123A-B after observing the light source 134 of those devices flashing. For example, if the user wants luminaire 121A in the lighting control group 305A, the installer picks or ignores the luminaire 121A via the provisioning device 107. Then a moment in time later (e.g., a few seconds), automatic curtsy programming 194 starts curtsying the luminaire 121B, and so forth.

Instead of waiting for the user to pick lighting system elements 104A-Z to add to the lighting control group/zone 305A, the automatic curtsy programming 194 can pick the strongest determined signal strength 196A-X and issue the flashing command 198A-X to those lighting system elements 104A-X in order of strongest to weakest. This is because luminaires 121A-H with a stronger signal strength 196A-H are more likely to be in a first room 301A when the provisioning device 107 is being carried through the first room 301A. When the provisioning device 107 is being carried through the first room 301A, luminaires 121I-P are likely to have very weak signal strengths 196I-P. In contrast, luminaires 121I-P are likely to have very strong signal strengths 196I-P when the provisioning device 107 is being carried through the second room 301A; and luminaires 121A-H are likely to have very weak signal strengths 196A-H. Based on this observation, the automatic curtsy protocol 200, can greatly speed up the time needed to provision the lighting system 100 and associated lighting system elements 104A-Z to form the lighting control groups 305A-B. Accordingly, the automatic curtsy programming 194 groups luminaires 121A-H into group/zone 305A together to act at the same time, as well as assigns lighting control devices 122A-B and sensors 123A-B to the lighting control group/zone 305A.

Alternatively, or additionally, automatic curtsy programming 194 of the provisioning device 107 can detect via an image sensor 199 that the light source 134 is flashing on the luminaire 121B and can watch to automatically pick the luminaire 121B to add to the lighting control group 305A. Hence, automatic curtsy programming 194 of the provisioning device 107 can start curtsying luminaires 121A-P in the rooms 301A-B and detect via the image sensor 199 the following. First, any luminaires 121A-H with a flashing light source 134 must be in a first room 301A and hence assigned to the first lighting control group 305A. Second, any luminaires 121I-P with a flashing light source 134 must be in a second room 301B and hence assigned to the second lighting control group 305B. Thus, automatic curtsy protocol 200 can be a combination of automatic curtsy without the user having to take any action to assign luminaires 121A-P to the lighting control groups 305A-B.

After commissioning and assigning luminaires 121A-H, lighting control devices 122A-B. and sensors 123A-B to the first lighting control group/zone 305A, the commissioning device 107 can program the lighting sequence of operation and the included behaviors into the luminaires 121A-H, lighting control devices 122A-B, and sensors 123A-B over the network 108.

Similarly, automatic curtsy programming 194 finds and groups luminaires 121I-P into the second lighting control group/zone 305B together to act at the same time, as well as assigns lighting control devices 122C-D and sensors 123C-D to the second lighting control group/zone 305B. After assigning these devices to the second lighting control group/zone 305B, provisioning device 107 programs the lighting sequence of operation and the included behaviors into the luminaires 121I-P, lighting control devices 122C-D, and sensors 123C-D over the network 108.

Automatic curtsy programming 194 can also tie the network addresses 137A-X to location coordinates 427A-X (see FIG. 4). For example, locations 300A-B can be defined on a more granular basis, such as location coordinates 427A-P in the space 120, to know exactly where the lighting system elements 104A-X are positioned in the rooms 301A-B. Yet alternatively, the rooms 301A-B may subdivide into two sides so the location coordinates 427A-P may be more specific to each room 301A-B, but not completely specific to each luminaire 121A-P.

As shown, the respective set of location coordinates 427A-P are located on a two-dimensional Cartesian coordinate system, which includes an X axis for horizontal (e.g., lateral) coordinate position and a Y axis for a vertical coordinate position (e.g., longitudinal). An X location coordinate component of the respective set of location coordinates 427A-P ranges from 1 to 4 in the example, and the Y location coordinate component of the respective set of location coordinates 127A-P ranges from 1 to 4. The X location coordinate and the Y location coordinate cover the entire floor area of the space 120, which maps each of the luminaires 121A-X to more specific areas of each room 301A-B.

In the example of FIGS. 1-4, lighting system elements 104A-X, such as luminaires 121A-P, lighting control devices 122A-D, and sensors 123A-D can communicate with the provisioning device 107 of the user to determine a physical location 498A-B of the lighting system elements 104A-X in the space 120. Based on the determined physical location 498A-B, the luminaires 121A-P, lighting control devices 122A-D, and sensors 123A-D can be assigned to a group/zone 305A-B to receive behaviors of a lighting sequence of operation for a corresponding room 301A-B.

Any of the functionality of the automatic curtsy protocol 200, including automatic curtsy programming 194 described herein for the provisioning device 107 and the flash programming 136 for the lighting system elements 104A-X, etc. can be embodied in one more applications or firmware as described previously. According to some embodiments, "function," "functions," "application," "applications," "instruction," "instructions," or "programming" are program (s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application can invoke API calls provided by the operating system to facilitate functionality described herein.

In the examples above, the lighting system elements 104A-X, provisioning device 107, etc. each include a processor. As used herein, a processor 131, 191, is a hardware circuit having elements structured and arranged to perform one or more processing functions, typically various data processing functions. Although discrete logic components could be used, the examples utilize components forming a programmable central processing unit (CPU). A processor 131, 191 for example includes or is part of one or more integrated circuit (IC) chips incorporating the electronic elements to perform the functions of the CPU.

The applicable processor 131, 191 executes programming or instructions to configure the lighting system elements 104A-X, provisioning device 107, etc. to perform various operations. For example, such operations may include various general operations (e.g., a clock function, recording and logging operational status and/or failure information) as well as various system-specific operations (e.g., daylighting and/or energy management) functions. Although a processor 131, 191 may be configured by use of hardwired logic, typical processors in lighting devices or in light responsive devices are general processing circuits configured by execution of programming, e.g., instructions and any associated setting data from the memories 130, 190 shown or from other included storage media and/or received from remote storage media.

In the examples above, the lighting system elements 104A-X, provisioning device 107, etc. each include a memory. The memory 130, 190 may include a flash memory (non-volatile or persistent storage), a read-only memory (ROM), and a random access memory (RAM) (volatile storage). The RAM serves as short term storage for instructions and data being handled by the processors 131, 191 e.g., as a working data processing memory. The flash memory typically provides longer term storage.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

In the examples above, the lighting system elements 104A-X, provisioning device 107, etc. each include a network communication interface 132, 192 for wired or wireless communication over one or more network(s) 108. The network(s) 108 interconnects the links to/from the network communication interfaces of the devices, so as to provide data communications amongst the lighting system elements 104A-X, provisioning device 107, etc. Network(s) 108 may support data communication by equipment at the premises via wired (e.g. cable or fiber) media or via wireless (e.g. WiFi, Bluetooth, ZigBee, LiFi, IrDA, etc.) or combinations of wired and wireless technology.

Unless otherwise stated, any and all measurements, values, ratings, positions, magnitudes, sizes, angles, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±5% or as much as ±10% from the stated amount.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," "has," "having," "containing," "contain", "contains," "with," "formed of," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A lighting system, comprising:
a plurality of lighting system elements; and
a provisioning device, including:
a wireless communication interface configured for wireless communication;
a memory;
a processor coupled to the wireless communication interface and the memory; and
automatic curtsy programming in the memory, wherein execution of the automatic curtsy programming by the processor configures the provisioning device to:
receive, via the wireless communication interface, wireless advertisements from a plurality of lighting system elements;
determine signal strengths to the lighting system elements based on the wireless advertisements or reported signal levels between the lighting system elements; and
form a lighting control group by:
iteratively transmitting a flashing command to each lighting system element to cause a light source on a lighting system element to flash in order of the determined signal strengths from highest to lowest;
determining whether the lighting system element with the light source flashing is being added to the lighting control group; and
assigning some or all of the lighting system elements to the lighting control group based on the determination.

2. The lighting system of claim 1, wherein determining whether the lighting system element with the light source flashing is being added to the lighting control group includes:
awaiting for a selection of the lighting system element with the light source flashing for addition to the lighting control group.

3. The lighting system of claim 2, wherein determining whether the lighting system element with the light source flashing is being added to the lighting control group further includes:
based on expiry of a predetermined time period during which the lighting system element is not selected for addition to the lighting control group, excluding the lighting system element from the lighting control group.

4. The lighting system of claim 2, wherein determining whether the lighting system element with the light source flashing is being added to the lighting control group further includes:
based on the lighting system element being selected for addition to the lighting control group within a predetermined time period, adding the lighting system element to the lighting control group.

5. The lighting system of claim 1, wherein determining whether the lighting system element with the light source flashing is being added to the lighting control group includes:
detecting, via an image sensor of the provisioning device, the light source of the lighting system element is flashing; and
in response to detecting the light source of the lighting system element is flashing, determining that the lighting system element is in a room of the lighting control group and is being added to the lighting control group.

6. The lighting system of claim 5, wherein the lighting system elements include luminaires.

7. The lighting system of claim 1, wherein a respective luminaire of the luminaires, includes:
an illumination light source to emit illumination lighting for a space;

a network communication interface configured for wireless communication;
a luminaire memory;
a luminaire processor coupled to the light source, the network communication interface, and the memory; and
flash programming in the luminaire memory, wherein execution of the flash programming by the luminaire processor causes the respective luminaire to:
flash the illumination light source in response to receiving the flashing command.

8. A method, comprising steps of:
receiving, via a wireless communication interface of a provisioning device, wireless advertisements from lighting system elements;
determining, via the provisioning device, signal strengths to the lighting system elements based on the wireless advertisements or reported signal levels between the lighting system elements; and
forming a lighting control group by:
iteratively transmitting, via the provisioning device, a flashing command to each lighting system element to cause a light source on a lighting system element to flash in order of the determined signal strengths from highest to lowest;
determining whether the lighting system element with the light source flashing is being added to the lighting control group; and
assigning, via the provisioning device, some or all of the lighting system elements to the lighting control group based on the determination.

9. The method of claim 8, wherein the step of determining whether the lighting system element with the light source flashing is being added to the lighting control group includes:
awaiting, on the provisioning device, for a selection of the lighting system element with the light source flashing for addition to the lighting control group.

10. The method of claim 9, wherein the step of determining whether the lighting system element with the light source flashing is being added to the lighting control group further includes:
based on expiry of a predetermined time period during which the lighting system element is not selected for addition to the lighting control group, excluding the lighting system element from the lighting control group.

11. The method of claim 9, wherein the step of determining whether the lighting system element with the light source flashing is being added to the lighting control group further includes:
based on the lighting system element being selected for addition to the lighting control group within a predetermined time period, adding the lighting system element to the lighting control group.

12. The method of claim 8, wherein the step of determining whether the lighting system element with the light source flashing is being added to the lighting control group includes:
detecting, via an image sensor of the provisioning device, the light source of the lighting system element is flashing; and
in response to detecting the light source of the lighting system element is flashing, determining that the lighting system element is in a room of the lighting control group and is being added to the lighting control group.

13. The method of claim 8, wherein the lighting system elements include luminaires.

14. The method of claim 13, further comprising:
flashing the light source in response to receiving the flashing command at a respective luminaire.

15. A non-transitory machine-readable medium, comprising:
automatic curtsy programming, wherein execution of the automatic curtsy programming by a processor configures a provisioning device to:
receive, via a wireless communication interface of the provisioning device, wireless advertisements from lighting system elements;
determine, via the provisioning device, signal strengths to the lighting system elements based on the wireless advertisements or reported signal levels between the lighting system elements; and
form a lighting control group by:
iteratively transmitting, via the provisioning device, a flashing command to each lighting system element to cause a light source on a lighting system element to flash in order of the determined signal strengths from highest to lowest;
determining whether the lighting system element with the light source flashing is being added to the lighting control group; and
assigning, via the provisioning device, some or all of the lighting system elements to the lighting control group based on the determination.

16. The non-transitory machine-readable medium of claim 15, wherein the determining whether the lighting system element with the light source flashing is being added to the lighting control group includes:
awaiting, on the provisioning device, for a selection of the lighting system element with the light source flashing for addition to the lighting control group.

17. The non-transitory machine-readable medium of claim 16, wherein the determining whether the lighting system element with the light source flashing is being added to the lighting control group further includes:
based on expiry of a predetermined time period during which the lighting system element is not selected for addition to the lighting control group, excluding the lighting system element from the lighting control group.

18. The non-transitory machine-readable medium of claim 16, wherein the determining whether the lighting system element with the light source flashing is being added to the lighting control group further includes:
based on the lighting system element being selected for addition to the lighting control group within a predetermined time period, adding the lighting system element to the lighting control group.

19. The non-transitory machine-readable medium of claim 15, wherein the determining whether the lighting system element with the light source flashing is being added to the lighting control group includes:
detecting, via an image sensor of the provisioning device, the light source of the lighting system element is flashing; and
in response to detecting the light source of the lighting system element is flashing, determining that the lighting system element is in a room of the lighting control group and is being added to the lighting control group.

20. The non-transitory machine-readable medium of claim 15, wherein the lighting system elements include luminaires.

\* \* \* \* \*